United States Patent
Wieland et al.

(10) Patent No.: US 12,203,399 B2
(45) Date of Patent: Jan. 21, 2025

(54) METHOD FOR DETERMINING A STATE PARAMETER OF AN EXHAUST GAS SENSOR

(71) Applicant: Vitesco Technologies GmbH, Regensburg (DE)

(72) Inventors: David Wieland, Munich (DE); Ludwig Schifferl, Munich (DE)

(73) Assignee: VITESCO TECHNOLOGIES GMBH, Regensburg (DE)

( * ) Notice: Subject to any disclaimer, the term of this patent is extended or adjusted under 35 U.S.C. 154(b) by 144 days.

(21) Appl. No.: 17/915,840

(22) PCT Filed: Mar. 4, 2021

(86) PCT No.: PCT/EP2021/055463
§ 371 (c)(1),
(2) Date: Sep. 29, 2022

(87) PCT Pub. No.: WO2021/197752
PCT Pub. Date: Oct. 7, 2021

(65) Prior Publication Data
US 2023/0128576 A1  Apr. 27, 2023

(30) Foreign Application Priority Data

Apr. 1, 2020 (DE) .................. 10 2020 204 213.6

(51) Int. Cl.
*F01N 11/00* (2006.01)
*F01N 9/00* (2006.01)

(52) U.S. Cl.
CPC ............... *F01N 11/00* (2013.01); *F01N 9/00* (2013.01); *F01N 2550/02* (2013.01); *F01N 2900/0416* (2013.01); *F01N 2900/1402* (2013.01)

(58) Field of Classification Search
CPC ........ F01N 11/00; F01N 9/00; F01N 2550/02; F01N 2900/0416; F01N 2900/1402;
(Continued)

(56) References Cited

U.S. PATENT DOCUMENTS

| 4,471,648 A | 9/1984 | Uchida et al. ................... 73/23 |
| 6,939,037 B2 | 9/2005 | Junginger et al. ............ 374/144 |

(Continued)

FOREIGN PATENT DOCUMENTS

| CN | 102 798 654 | 11/2012 |
| CN | 102798654 A | * 11/2012 |

(Continued)

OTHER PUBLICATIONS

Machine Translation of CN102798654 (Year: 2012).*
(Continued)

*Primary Examiner* — Brandon D Lee
(74) *Attorney, Agent, or Firm* — Slayden Grubert Beard PLLC

(57) ABSTRACT

Various embodiments of the teachings herein include a method for determining a state parameter of an exhaust gas sensor with a sensor element and a heating device arranged in the sensor element for heating the sensor element. The heating device is electrically connected via a first electrical line and a second electrical line to a control device for electrically controlling the heating device. The heating device includes a measuring line electrically connected between the control device and the first electrical line for controlling the temperature-dependent resistance of the heating section. The method may include: determining a measurement voltage dropped between the first electrical line and the measuring line; determining a compensation voltage on the basis of a predetermined reference voltage and the determined measurement voltage; and determining (Continued)

the state parameter of the exhaust gas sensor by assigning the determined compensation voltage to the state parameter.

9 Claims, 2 Drawing Sheets

(58) Field of Classification Search
CPC ... Y02T 10/40; F02D 41/146; F02D 41/1494; F02D 41/222; G01N 27/4067
See application file for complete search history.

(56) References Cited

U.S. PATENT DOCUMENTS

| | | | |
|---|---|---|---|
| 7,462,266 | B2 | 12/2008 | Miyata et al. ............... 204/408 |
| 2005/0029250 | A1 | 2/2005 | Niwa ........................... 219/494 |
| 2012/0199478 | A1* | 8/2012 | Sasaki ................. G01N 27/419 204/406 |
| 2019/0078491 | A1* | 3/2019 | Fosaaen ................ G01N 27/16 |
| 2022/0010713 | A1* | 1/2022 | McCarthy, Jr. ....... F01N 3/2013 |

FOREIGN PATENT DOCUMENTS

| | | |
|---|---|---|
| CN | 102 854 393 | 1/2013 |
| CN | 202 903 887 | 4/2013 |
| CN | 104 897 966 | 9/2015 |
| CN | 104 932 583 | 9/2015 |
| CN | 105 892 529 | 8/2016 |
| CN | 110 735 699 | 1/2020 |
| EP | 1 239 282 | 9/2002 |
| EP | 2 105 729 | 9/2009 |
| EP | 3 217 169 | 9/2017 |
| JP | 2004 325 218 | 11/2004 |
| JP | 2006 284 223 | 10/2006 |
| WO | 2020/192973 A1 | 10/2020 |

OTHER PUBLICATIONS

Search Report for International Application No. PCT/EP2019/060865, 13 pages, May 7, 2019
Office Action for DE Patent Application No. 10 2020 201 213.6, 8 pages, Sep. 30, 2020.
"Industrial Platinum Resistance Thermometers and Platinum Temperature Sensors," DIN EN IEC 60751, 40 pages (German w/ English translation on pp. 25-40) Sep. 2019.
German Office Action, Application No. 102020204213.6, 7 pages Nov. 5, 2024.

* cited by examiner

METHOD FOR DETERMINING A STATE PARAMETER OF AN EXHAUST GAS SENSOR

CROSS-REFERENCE TO RELATED APPLICATIONS

This application is a U.S. National Stage Application of International Application No. PCT/EP2021/055463 filed Mar. 4, 2021, which designates the United States of America, and claims priority to DE Application No. 10 2020 204 213.6 filed Apr. 1, 2020, the contents of which are hereby incorporated by reference in their entirety.

TECHNICAL FIELD

The present disclosure relates to sensors. Various embodiments of the teachings herein may include method and/or devices for determining a state parameter of an exhaust gas sensor, for example of a nitrogen oxide sensor, and in particular a method for determining a corrected nitrogen oxide value and/or a temperature of the nitrogen oxide sensor element.

BACKGROUND

Exhaust gas sensors, such as nitrogen oxide sensors, lambda probes, and oxygen sensors, for example, may be based on the amperometric principle, i.e. on an electrochemical method for quantitatively determining chemical substances. In particular, an electric current is set at an electrode of the exhaust gas sensor in such a way that an electrochemical potential that is constant over time is established. By way of example, nitrogen oxide sensors allow a measurement of the nitrogen oxide concentration in the exhaust gas of internal combustion engines, for example gasoline or diesel engines. This enables e.g. optimum control and diagnosis of nitrogen oxide catalytic converters by the engine controller.

Exhaust gas sensors of this type typically comprise a main body formed from a solid electrolyte, in which cavities with assigned electrodes are provided. In addition, a heating device is arranged in the main body, and is configured to heat the main body to a predetermined operating temperature and to keep it at this temperature, for example at approximately 850° C. On account of additional external supply of heat, such as results from the exhaust gas flowing around the exhaust gas sensor, for example, the electrodes may be hotter than in the initial state, which may result in an increased signal of the exhaust gas sensor, for example an excessively high nitrogen oxide value. Further exhaust gas sensors are described in CN 102 798 654 B, US 2019/0078491 A1, U.S. Pat. No. 7,462,266 B2, US 2005/0029250 A1 and U.S. Pat. No. 6,939,037 B2.

SUMMARY

Various embodiments of the present disclosure include methods and/or devices for determining a state parameter of an exhaust gas sensor, by means of which method the accuracy of the exhaust gas sensor can be at least partly increased. For example, some embodiments include a method for determining a state parameter of an exhaust gas sensor (10) comprising a sensor element (12) and a heating device (60) arranged in the sensor element (12) and intended for heating the sensor element (12), wherein the heating device (60) comprises a heating section (62) arranged in the sensor element (12), said heating section being electrically connected, via a first electrical line (64) and a second electrical line (66), to a control device for electrically controlling the heating section (62), wherein the heating device (60) furthermore comprises a measuring line (68), which is electrically connected between the control device and the first electrical line (64) and by means of which the temperature-dependent resistance of the heating section (62) controllable, wherein the method comprises: determining a measurement voltage dropped between the first electrical line (64) and the measuring line (68), determining a compensation voltage on the basis of a predetermined reference voltage and the determined measurement voltage, and determining the state parameter of the exhaust gas sensor (10) by means of assigning the determined compensation voltage to the state parameter.

In some embodiments, assigning the determined compensation voltage to the state parameter is effected by means of an assignment table and/or an assignment specification.

In some embodiments, determining the compensation voltage comprises determining a difference between the predetermined reference voltage and the determined measurement voltage.

In some embodiments, the predetermined reference voltage corresponds to a measurement voltage dropped between the first electrical line (64) and the measuring line (68) at a predetermined temperature of the sensor element (12).

In some embodiments, the predetermined temperature corresponds to a room temperature of approximately 20° C.

In some embodiments, the state parameter is a compensation nitrogen oxide value, wherein the method furthermore comprises determining a corrected nitrogen oxide value taking account of the compensation nitrogen oxide value.

In some embodiments, determining the corrected nitrogen oxide value comprises: determining a nitrogen oxide value by means of the exhaust gas sensor (10), and determining the corrected nitrogen oxide value by means of subtracting the compensation nitrogen oxide value from the determined nitrogen oxide value.

In some embodiments, the state parameter is the average temperature of a section of the sensor element (12) which surrounds the first electrical line (64), the second electrical line (66) and the measuring line (68).

In some embodiments, the exhaust gas sensor (10) furthermore comprises a housing, in which the sensor element (12) together with the heating device (60) are arranged, the method furthermore comprising determining the temperature of the housing at least partly on the basis of the average temperature of the section of the sensor element (12) which surrounds the first electrical line (64), the second electrical line (66) and the measuring line (68).

BRIEF DESCRIPTION OF THE DRAWINGS

Further features and objects of the present disclosure will become apparent to a person skilled in the art by putting the present teaching into practice and taking into consideration the accompanying drawings, in which.

DETAILED DESCRIPTION

Figure 1:
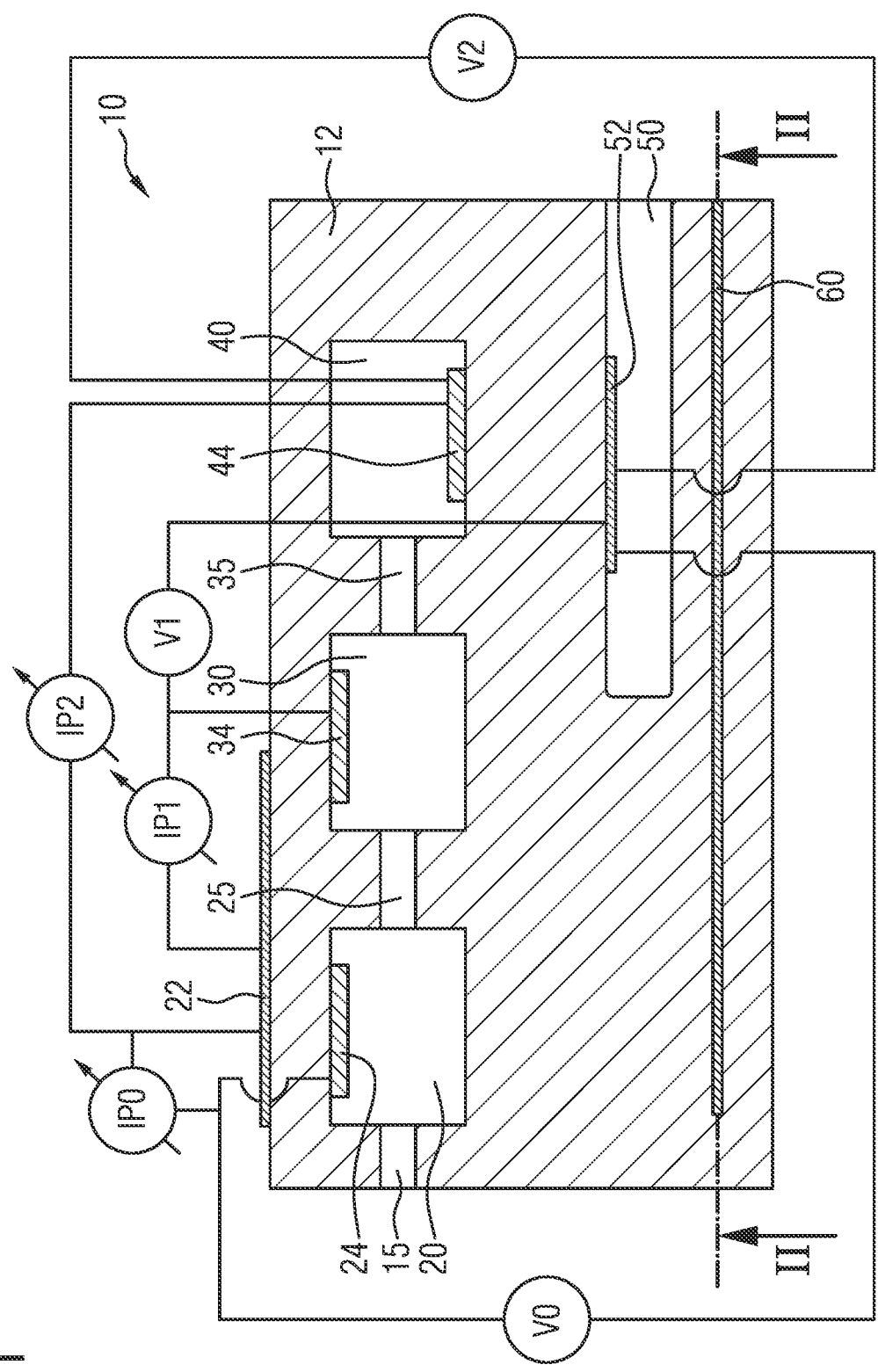
FIG. 1 shows a schematic sectional view through an exhaust gas sensor for an internal combustion engine of a vehicle, said exhaust gas sensor being illustrated by way of example in the form of a nitrogen oxide sensor incorporating teachings of the present disclosure.

Various embodiments of the present disclosure include determining the voltage drop between an electrical supply line of a heating device of the exhaust gas sensor and a measuring line connected to said electrical supply line, and of comparing this determined voltage drop with a predetermined reference voltage in order to determine a compensation voltage. The compensation voltage determined thereby can then be used for determining a state parameter of the exhaust gas sensor by means of assigning the determined compensation voltage to the state parameter. By way of example, the state parameter can be a compensation nitrogen oxide value which can be used for correcting the nitrogen oxide value determined by means of the exhaust gas sensor. In some embodiments, the state parameter can indicate the average temperature of the sensor element in the region of the electrical supply lines of the heating device.

In some embodiments, the determined compensation voltage can serve to indicate the average temperature of the sensor element in the region of the electrical supply lines of the heating device, on the basis of which in turn the housing temperature of the exhaust gas sensor can be determined. An increased average temperature of the sensor element in the region of the electrical supply lines of the heating device and/or an increased housing temperature may have the effect that the measurement accuracy of the exhaust gas sensor is corrupted. In particular, the increase in the temperature in the region of the supply lines may disturb the heat dissipation from the tip of the sensor element, where the heating section of the heating device is accommodated in the sensor element. The temperature profile in the tip of the sensor element may change as a result, which is able to be compensated for only with great difficulty. However, the changed temperature profile may have the consequence that the pump electrode arranged closer to the sensor element tip is cooler than the measuring electrode. The discussed measurement error of the detected nitrogen oxide concentration may arise as a result.

Consequently, the determined compensation voltage can be used to determine the average temperature of the sensor element in the region of the electrical supply lines of the heating device, as a result of which in turn a compensation of the corrupted measurement values of the exhaust gas sensor can be carried out.

In some embodiments, there is a method for determining a state parameter of an exhaust gas sensor comprising a sensor element and a heating device arranged in the sensor element and intended for heating the sensor element. The heating device comprises a heating section arranged in the sensor element, said heating section being electrically connected, via a first electrical line and a second electrical line, to a control device for electrically controlling the heating section. The heating device furthermore comprises a measuring line, which is electrically connected between the control device and the first electrical line and by means of which the temperature-dependent resistance of the heating section is controllable.

In some embodiments, the method comprises determining a measurement voltage dropped between the first electrical line and the measuring line, determining a compensation voltage on the basis of a predetermined reference voltage and the determined measurement voltage, and determining the state parameter of the exhaust gas sensor by means of assigning the determined compensation voltage to the state parameter.

In some embodiments, assigning the determined compensation voltage to the state parameter may be effected by means of an assignment table and/or an assignment specification, such as a mathematical mapping, for example. In some embodiments, the assignment table may comprise empirical values determined previously under predetermined conditions, which assigns the corresponding state parameter to the determined compensation voltage.

In some embodiments, determining the compensation voltage comprises determining a difference between the predetermined reference voltage and the determined measurement voltage. In this case, the predetermined reference voltage may correspond to a measurement voltage dropped between the first electrical line and the measuring line at a predetermined temperature of the sensor element and during a thermally stable operating state of the exhaust gas sensor. In some embodiments, the predetermined temperature is a room temperature of approximately 20° C.

In some embodiments, the state parameter is a compensation nitrogen oxide value. In this case, the method may furthermore comprise determining a corrected nitrogen oxide value taking account of the compensation nitrogen oxide some value. In embodiments, determining the corrected nitrogen oxide value may comprise determining a nitrogen oxide value by means of the exhaust gas sensor, and determining the corrected nitrogen oxide value by means of subtracting the compensation nitrogen oxide value from the determined nitrogen oxide value. In particular, an offset of the nitrogen oxide value can be at least partly compensated for as a result.

In some embodiments, the state parameter can be the average temperature of a section of the sensor element which surrounds the first electrical line, the second electrical line and the measuring line. The exhaust gas sensor furthermore comprises a housing, in which the sensor element together with the heating device is arranged. In some embodiments, the method may furthermore comprise determining the temperature of the housing at least partly on the basis of the average temperature of the section of the sensor element which surrounds the first electrical line, the second electrical line and the measuring line.

On the basis of the determined temperature of the housing, a method may include determining a state of the exhaust gas sensor, and switching off the exhaust gas sensor in order to protect components of the housing against overheating. By way of example, an increased temperature of the housing may have the effect that possible seals provided at the electrical connecting plug no longer seal properly. In some embodiments, it may be advantageous to output a warning signal that indicates a faulty exhaust gas sensor with insufficiently accurate exhaust gas signals.

In the context of the present disclosure, sensors that operate using amperometry, such as nitrogen oxide sensors, lambda probes and oxygen sensors, for example, are characterized in that their measurement principle is based on amperometry, i.e. on an electrochemical method for quantitatively determining chemical substances. In particular, an electric current is set at a working electrode in such a way that an electrochemical potential that is constant over time is established.

Furthermore, in the context of the present disclosure, the term "control" encompasses the control engineering terms "open-loop control" and "closed-loop control". A person skilled in the art will recognize in each case when open-loop control should be applied and when closed-loop control should be applied.

FIG. 1 shows an exemplary nitrogen oxide sensor 10, representing an example of an exhaust gas sensor incorporating teachings of the present disclosure. Consequently, the teachings of the present disclosure may be used in the case of all sensors for internal combustion engines for vehicles which comprise a heating device, such as lambda probes and oxygen sensors, for example. In particular, various embodiments of the present disclosure may be applicable to exhaust gas sensors which comprise a ceramic main support with a pair of electrodes attached thereto.

Referring to FIG. 1, a schematic sectional view of the exemplary nitrogen oxide sensor 10 is illustrated, which sensor is configured to be arranged in an outlet tract of an internal combustion engine (not shown) and to quantitatively detect the nitrogen oxide content and/or the oxygen content in the exhaust gas of the internal combustion engine.

The nitrogen oxide sensor 10 comprises a main body 12 composed of a solid electrolyte, which is preferably formed from a mixed crystal composed of zirconium oxide and yttrium oxide and/or by a mixed crystal composed of zirconium oxide and calcium oxide. In addition, a mixed crystal composed of hafnium oxide, a mixed crystal composed of perovskite-based oxides or a mixed crystal composed of trivalent metal oxide can be used, such as aluminum oxide ($Al_2O_3$), for example. The main body 12 forms a sensor element of the exhaust gas sensor 10. Hereinafter, therefore, the main body 12 is also referred to as sensor element 12.

A first pump cavity 20, a second pump cavity 30 and a measuring cavity 40 are provided within the main body 12 of the nitrogen oxide sensor 10 illustrated by way of example. The first pump cavity 20 is connected to the exterior of the main body 12 via a connecting path 15. In particular, exhaust gas can flow through the connecting path 15 into the first pump cavity 20. The second pump cavity 30 is connected to the first pump cavity 20 via a first diffusion path 25.

The measuring cavity 40 is connected to the second pump cavity 30 via a second diffusion path 35.

Moreover, a reference cavity 50 is formed in the main body 12, and is directly connected to the exterior of the main body 12. A reference electrode 52 is arranged within the reference cavity 50. In particular, the reference cavity 50 is connected to the ambient air, i.e. not to the exhaust gas, and is configured to form an oxygen reference for the various electrodes arranged in the nitrogen oxide sensor 10.

An exhaust gas electrode 22 is arranged on an outer side of the main body 12. In particular, during measurement operation of the nitrogen oxide sensor 10, by applying a reference current to the exhaust gas electrode 22, the oxygen situated in the exhaust gas can be ionized and can flow through the main body 12 as oxygen ions to the reference electrode 52 and can be converted there into oxygen molecules in order to form an oxygen reference.

A first pump electrode 24 is arranged within the first pump cavity 20. In particular, during measurement operation of the nitrogen oxide sensor 10, by applying a first pump current IP0 to the first pump electrode 24, the oxygen situated in the exhaust gas can be ionized within the first pump cavity 20 and can migrate or pass through the main body 12 as oxygen ions. On account of the oxygen ions output from the first pump cavity 20, a first electrode voltage or first Nernst voltage V0 forms indirectly between the first pump electrode 24 and the reference electrode 52. To put it more precisely, the first electrode voltage or the first Nernst voltage V0 forms directly from the residual oxygen still present in the first pump cavity 20.

A second pump electrode 34 is arranged within the second pump cavity 30. Here, during measurement operation of the nitrogen oxide sensor 10, by applying a second pump current IP1 to the second pump electrode 34, the oxygen situated in the gas mixture can be ionized within the second pump cavity 30 and can migrate or pass through the main body 12 as oxygen ions. On account of the oxygen ions output from the second pump cavity 30, a second electrode voltage or second Nernst voltage V1 forms indirectly between the second pump electrode 34 and the reference electrode 52. To put it more precisely, the second electrode voltage or the second Nernst voltage V1 forms directly from the residual oxygen still present in the second pump cavity 30.

A measuring electrode 44 is arranged within the measuring cavity 40, and is configured, during measurement operation of the nitrogen oxide sensor 10, upon the application of a measurement current IP2, to ionize the oxygen and/or nitrogen oxides present within the measuring cavity 40, such that the oxygen ions can migrate or pass through the main body 12. On account of the oxygen ions output or pumped out from the measuring cavity 40, a third electrode voltage or third Nernst voltage V2 forms between the measuring electrode 44 and the reference electrode 52, and is kept at a constant value by the application of the measurement current IP2 to the measuring electrode 44. To put it more precisely, the third electrode voltage or the third Nernst voltage V2 forms directly from the residual oxygen still present in the measuring cavity 40. The applied measurement current IP2 is then an indication of the nitrogen oxide content situated within the exhaust gas.

The nitrogen oxide sensor 10 shown in FIG. 1, which represents an example of a sensor based on the amperometric measurement principle, thus comprises three relevant electrode pairs, namely a first electrode pair consisting of the first pump electrode 24 and the exhaust gas electrode 22, a second electrode pair consisting of the second pump electrode 34 and the exhaust gas electrode 22, and a third electrode pair consisting of the measuring electrode 44 and the exhaust gas electrode 22.

In some embodiments, the pump currents IP0 and IP1 present at the first and second pump electrodes 24, 34 are set in such a way that only the oxygen is ionized, but not the nitrogen oxides. In particular, the first pump electrode 24 is configured, during normal operation of the nitrogen oxide sensor 10, to pump almost the entire oxygen from the exhaust gas or to permit a predetermined oxygen slippage from the first pump cavity 20 into the second pump cavity 30. The second pump electrode 34 is configured to ionize the oxygen that has not yet been pumped out from the first pump cavity 20 and to guide it away, such that virtually only nitrogen oxides are present in the measuring cavity 40. The measuring electrode 44 is configured to ionize the nitrogen oxides, wherein the measurement current IP2 applied to the measuring electrode 44 is a measure of the nitrogen oxide content in the exhaust gas.

Furthermore, a heating device 60 is arranged within the main body 12, and is configured to heat the main body 12 to a predetermined operating temperature and to keep it at this temperature, for example at approximately 850° C.

The mode of operation for determining the nitrogen oxide content in the exhaust gas of the internal combustion engine by means of the nitrogen oxide sensor 10 disclosed is already known from the prior art, to which reference is made at this juncture.

Specifically, the closed-loop control principle for the nitrogen oxide sensor 10 in FIG. 1 is characterized in that the respective electrode voltages or Nernst voltages V0, V1, V2 are kept at a constant level by applying and adapting the pump currents IP0, IP1 and the measurement current IP2.

Figure 2:
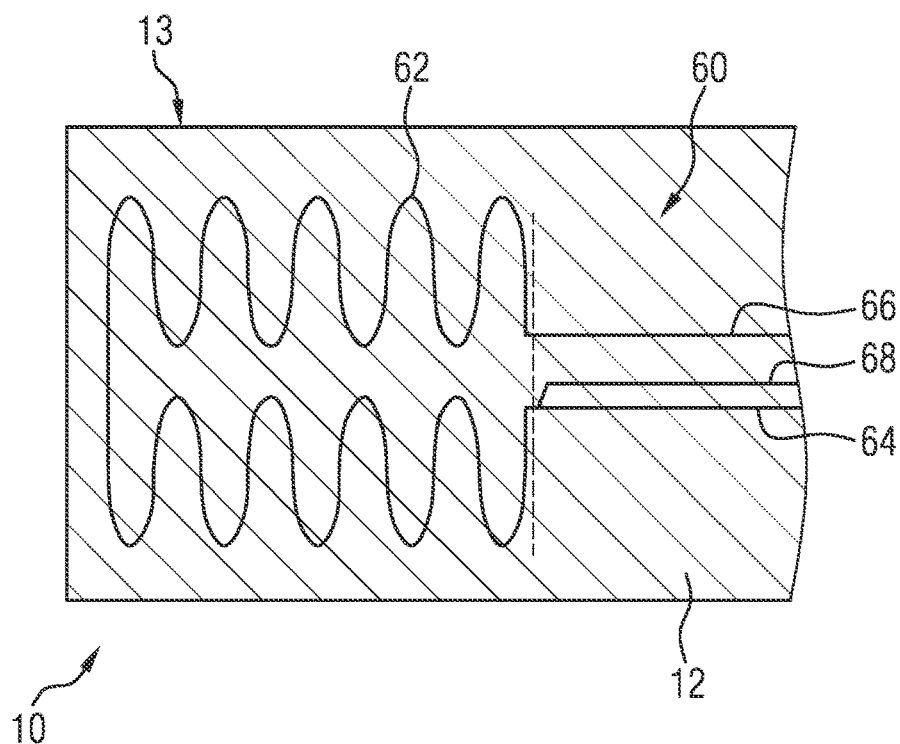
FIG. 2 shows a schematic sectional view through the exhaust gas sensor from FIG. 1 along the line II-II.

FIG. 2 shows a sectional view through the exhaust gas sensor 10 from FIG. 1 along the line II-II. FIG. 2 shows that the heating device 60 is fully embedded in the sensor element 12 and arranged therein and comprises a heating section 62 configured for heating the sensor element 12, said heating section being electrically connected, via a first electrical line 64 and a second electrical line 66, to a control device (not explicitly illustrated) for electrically controlling the heating section 62. FIG. 2 illustrates the heating section 62 in a manner separated from the first electrical line 64 and the second electrical line 66 by a dashed line. In particular, the heating section 62 is a heating filament configured to heat the sensor element 12 in particular in the direct vicinity of the first pump cavity 20, the second pump cavity 30 and the measuring cavity 40 to the operating temperature of approximately 850° C. Consequently, the electrodes 24, 34, 44 (see FIG. 1) are thus correspondingly heated as well.

In addition, the heating device 60 comprises an electrical measuring line 68 electrically connected between the control device and the first electrical line 64. The measuring line 68 is in particular an electrical line which is at high resistance (approximately 6 ohms to the relative first line (approximately 0.4 ohm [Ω]) and the second line (approximately 0.4 ohm [Ω]), which bridges the heating section 62 and which is configured to control the resistance or the operating temperature of the sensor element 12 in the region of the heating section 62. In particular, the electrical resistance of the heating section 62 can be determined by means of a resistance measurement between the first electrical line 64 and the measuring line 68 or respectively a resistance measurement between the second electrical line 66 and the measuring line 68, in order thus to control the heating energy fed electrically to the heating section 62 for the purpose of heating the sensor element 12 to the predetermined setpoint temperature. The heating section 62 is arranged in particular in an end region 13 of the sensor element.

Figure 3:
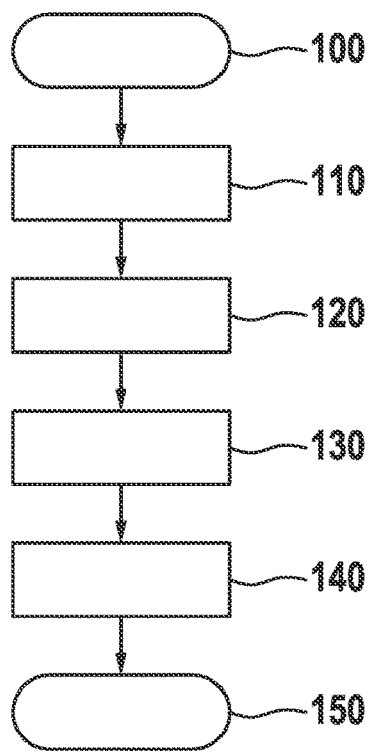
FIG. 3 shows an exemplary flowchart of a method incorporating teachings of the present disclosure for determining a corrected nitrogen oxide value.

Referring additionally to FIG. 3, an exemplary method incorporating teachings of the present disclosure for determining a corrected nitrogen oxide value is explained below.

The method in FIG. 3 starts at step 100 and then passes to step 110, which involves determining a measurement voltage dropped between the first electrical line 64 and the measuring line 68. A succeeding step 120 involves determining a compensation voltage on the basis of a predetermined reference voltage and the determined measurement voltage. The predetermined reference voltage is for example a measurement voltage dropped between the first electrical line 64 and the measuring line 68, said measurement voltage being dropped between these two lines 64, 68 at a predetermined (known) temperature of the sensor element 12 (such as, for example, at room temperature of approximately 20° C.). In particular, in step 120, the compensation voltage is determined by forming the difference between the predetermined reference voltage and the determined measurement voltage.

A further step 130 involves determining a compensation nitrogen oxide value by means of assigning the determined compensation voltage to the compensation nitrogen oxide value. This can be effected on the basis of an assignment table, for example, which assigns the determined compensation voltage to a corresponding compensation nitrogen oxide value. Alternatively, the assigning can be effected by means of a mathematical mapping.

In a further step 140, the nitrogen oxide value detected by the exhaust gas sensor 10 as measurement current IP2 is then corrected taking account of the determined compensation nitrogen oxide value to form a corrected nitrogen oxide value. In particular, in this case, the determined compensation nitrogen oxide value is subtracted from the nitrogen oxide value which is detected by the exhaust gas sensor 10 and which is indicated by the measurement current IP2.

In accordance with a further method incorporating teachings of the present disclosure, instead of or in addition to step 130 in FIG. 3, a method step is carried out in which the determined compensation voltage is assigned a corresponding sensor element temperature value for that region of the sensor element 12 which surrounds the electrical lines 64, 66, 68. From the sensor element temperature value thus determined, the temperature of a housing (not explicitly illustrated) of the exhaust gas sensor 10 can be estimated in a further step. The compensation of the determined nitrogen oxide values of the exhaust gas sensor 10 can then be effected on the basis of the determined average temperature of that region of the sensor element 12 which surrounds the electrical lines 64, 66, 68 and/or on the basis of the determined housing temperature.

The nitrogen oxide offset that can arise on account of an increased temperature of the e sensor element 12 in the region of the electrical lines 64, 66, 68 can thus be at least partly compensated for with the aid of the method according to the invention. In some embodiments, the exhaust gas flowing around the exhaust gas sensor 10 may result in the increase in the temperature of the aforementioned region of the sensor element 12. The hot exhaust gas may increase the temperature of the housing of the exhaust gas sensor 10, which, by way of convection and conduction, may in turn result in the heating of the region of the sensor element 12 that surrounds the electrical lines 64, 66, 68. In addition, the heated exhaust pipe and further external heat sources, such as turbocharger and exhaust manifold, for example, may result in an increase in the temperature of the housing of the exhaust gas sensor 10, which may in turn adversely affect the measurement accuracy of the exhaust gas sensor (see above). As a result of the increase in the temperature of the sensor element 12 of the exhaust gas sensor 10, less temperature may be dissipated from the front measurement region of the sensor element 12, which may result in a shift in the temperature profile of the electrodes of the exhaust gas sensor 10, compared with a normal operating state or with the new state of the exhaust gas sensor 10. As a result of the increase in the temperature of the measuring electrode 44, the measurement current IP2 may become greater and the NOx signal may thus be greater than in reality.

What is claimed is:

1. A method for operating an exhaust gas sensor with a sensor element and a heating device arranged in the sensor element for heating the sensor element, the heating device electrically connected, via a first electrical line and a second electrical line, to a control device for electrically controlling the heating device, wherein the heating device includes a measuring line electrically connected between the control device and the first electrical line for controlling the temperature-dependent resistance of the heating section, the method comprising:

measuring a sensed value of an operating variable generated by the exhaust gas sensor;

determining a measurement voltage dropped between the first electrical line and the measuring line;

determining a compensation voltage on the basis of a predetermined reference voltage and the determined measurement voltage;

determining a state parameter of the exhaust gas sensor by assigning the determined compensation voltage to the state parameter; and determining an actual value of the operating variable based on the determined state parameter and the sensed value.

2. The method as claimed in claim 1, wherein assigning the determined compensation voltage to the state parameter includes using an assignment table and/or an assignment specification.

3. The method as claimed in claim 1, wherein determining the compensation voltage comprises determining a difference between the predetermined reference voltage and the determined measurement voltage.

4. The method as claimed in claim 1, wherein the predetermined reference voltage corresponds to a measurement voltage dropped between the first electrical line and the measuring line at a predetermined temperature of the sensor element.

5. The method as claimed in claim 4, wherein the predetermined temperature corresponds to approximately 20° C.

6. The method as claimed in claim 1, wherein:

the state parameter comprises a compensation nitrogen oxide value; and the method furthermore comprises determining a corrected nitrogen oxide value taking account of the compensation nitrogen oxide value.

7. The method as claimed in claim 6, wherein determining the corrected nitrogen oxide value comprises:

determining a nitrogen oxide value by means of the exhaust gas sensor; and determining the corrected nitrogen oxide value by means of subtracting the compensation nitrogen oxide value from the determined nitrogen oxide value.

8. The method as claimed in claim 1, wherein the state parameter includes an average temperature of a section of the sensor element surrounding the first electrical line, the second electrical line, and the measuring line.

9. The method as claimed in claim 8, wherein:

the exhaust gas sensor furthermore comprises a housing, in which the sensor element and the heating device are arranged; and the method furthermore comprises determining the temperature of the housing at least partly based on the average temperature of the section of the sensor element which surrounds the first electrical line, the second electrical line, and the measuring line.

* * * * *